(12) United States Patent
Tang et al.

(10) Patent No.: US 11,235,543 B2
(45) Date of Patent: Feb. 1, 2022

(54) PHOTO-ALIGNABLE OBJECT

(71) Applicant: ROLIC AG, Zug (CH)

(72) Inventors: Qian Tang, Oberwil (CH); Hubert Seiberle, Weil am Rhein (DE); Jean-François Eckert, Kientzville (FR); Martin Roth, Holstein (CH); Thierry Becret, Blotzheim (FR); Herve Vissieres, Illfurth (FR)

(73) Assignee: ROLIC AG, Zug (CH)

( * ) Notice: Subject to any disclaimer, the term of this patent is extended or adjusted under 35 U.S.C. 154(b) by 0 days.

(21) Appl. No.: 16/356,401

(22) Filed: Mar. 18, 2019

(65) Prior Publication Data

US 2019/0210309 A1 Jul. 11, 2019

Related U.S. Application Data

(62) Division of application No. 14/911,786, filed as application No. PCT/EP2014/067196 on Aug. 12, 2014, now Pat. No. 10,286,616.

(30) Foreign Application Priority Data

Aug. 19, 2013 (EP) .................................... 13180803
Dec. 20, 2013 (EP) .................................... 13198795

(51) Int. Cl.
*G02B 30/27* (2020.01)
*B29D 11/00* (2006.01)
*G02F 1/1337* (2006.01)
*G02F 1/1335* (2006.01)
(Continued)

(52) U.S. Cl.
CPC .... *B29D 11/00788* (2013.01); *B29D 11/0074* (2013.01); *G02B 30/27* (2020.01); *G02F 1/133526* (2013.01); *G02F 1/133711* (2013.01); *G02F 1/133788* (2013.01);
(Continued)

(58) Field of Classification Search
CPC .......... B29D 11/00788; B29D 11/0074; G02F 1/133788; G02F 1/133711; G02F 1/133526; G02F 1/29; G02B 30/27
See application file for complete search history.

(56) References Cited

U.S. PATENT DOCUMENTS

| 4,122,027 A | 10/1978 | Cole, Jr. et al. |
| 4,401,369 A | 4/1983 | Jones |
| 4,565,424 A | 1/1986 | Huffman et al. |

(Continued)

FOREIGN PATENT DOCUMENTS

| EP | 1 840 604 A1 | 10/2007 |
| EP | 2447769 B1 | 3/2015 |

(Continued)

OTHER PUBLICATIONS

International Search Report for PCT/EP2014/067196 dated Oct. 22, 2014.

*Primary Examiner* — Mathieu D Vargot
(74) *Attorney, Agent, or Firm* — Sughrue Mion, PLLC (57) ABSTRACT

A photo-alignable object has a thickness of more than 2 μm. The photo-alignable object can be in the form of a free standing film. Also, the photo-alignable object can have a topographical surface structure. The depth of the topographical surface structure can be larger than 100 nm, and preferably the depth of the topographical surface structure is larger than 1 μm.

19 Claims, 5 Drawing Sheets

(51) Int. Cl.
  *G02F 1/29* (2006.01)
  *G02F 1/1333* (2006.01)
(52) U.S. Cl.
  CPC .. *G02F 1/133365* (2013.01); *G02F 1/133504* (2013.01); *G02F 1/29* (2013.01)

(56) References Cited

U.S. PATENT DOCUMENTS

| | | | |
|---|---|---|---|
| 4,667,020 | A | 5/1987 | Etzbach et al. |
| 5,389,285 | A | 2/1995 | Shannon et al. |
| 5,500,765 | A * | 3/1996 | Eichenlaub ............ G02B 30/27 359/463 |
| 5,539,074 | A | 7/1996 | Herr et al. |
| 5,825,448 | A * | 10/1998 | Bos .................. G02F 1/1396 349/128 |
| 6,107,427 | A | 8/2000 | Herr et al. |
| 6,201,087 | B1 | 3/2001 | Herr et al. |
| 6,632,909 | B2 | 10/2003 | Buchecker et al. |
| 6,717,644 | B2 | 4/2004 | Schadt et al. |
| 7,959,990 | B2 | 6/2011 | Cherkaoui et al. |
| 2004/0209008 | A1 | 10/2004 | Liang et al. |
| 2004/0240777 | A1 | 12/2004 | Gate et al. |
| 2005/0003189 | A1 | 1/2005 | Bredt et al. |
| 2005/0271803 | A1 | 12/2005 | Liu et al. |
| 2006/0152812 | A1 | 7/2006 | Woodgate et al. |
| 2008/0036946 | A1 | 2/2008 | Ono et al. |
| 2009/0209741 | A1 | 8/2009 | Nakanishi et al. |
| 2009/0290109 | A1 | 11/2009 | Lee et al. |
| 2009/0322970 | A1 | 12/2009 | Iwane |
| 2010/0266821 | A1 | 10/2010 | Bury et al. |
| 2011/0017838 | A1 | 1/2011 | Delbaere et al. |
| 2011/0051026 | A1 | 3/2011 | Kim et al. |
| 2012/0196054 | A1 | 8/2012 | Lee et al. |
| 2012/0316317 | A1 | 12/2012 | Eckert et al. |
| 2013/0215340 | A1 | 8/2013 | Su et al. |
| 2014/0063611 | A1 * | 3/2014 | Raymond ............... G02B 30/27 359/619 |
| 2015/0109597 | A1 | 4/2015 | Schmitt et al. |

FOREIGN PATENT DOCUMENTS

| | | |
|---|---|---|
| JP | 2001-290028 A | 10/2001 |
| JP | 2005-346029 A | 12/2005 |
| JP | 2007-502713 A | 2/2007 |
| JP | 2007-535686 A | 12/2007 |
| JP | 2009-258151 A | 11/2009 |
| JP | 2010-175931 A | 8/2010 |
| JP | 2010-281998 A | 12/2010 |
| WO | 2005/006774 A1 | 1/2005 |
| WO | 2010/150748 A1 | 12/2010 |
| WO | 2012/085735 A2 | 6/2012 |
| WO | 2013/178453 A1 | 12/2013 |

* cited by examiner

PHOTO-ALIGNABLE OBJECT

CROSS REFERENCE TO RELATED APPLICATIONS

This application is a divisional of application Ser. No. 14/911,786 filed Feb. 12, 2016, now U.S. Pat. No. 10,286,616, which is a National Stage of International Application No. PCT/EP2014/067196 filed Aug. 12, 2014 (claiming priority based on European Patent Application Nos. 13180803.2 filed Aug. 19, 2013 and 13198795.0 filed Dec. 20, 2013), the contents of which are incorporated herein by reference in their entirety.

TECHNICAL FIELD

The invention relates to objects with photo-alignment properties and methods for their preparation.

BACKGROUND OF THE INVENTION

Recently, photo-alignment has been successfully introduced in large scale production of liquid crystal displays (LCD) and anisotropic optical films for various applications, such as 3D-converter films, also known as film patterned retarders, for passive 3D television and monitors. In each of above applications, thin photo-alignment layers are employed to align liquid crystals. In case the photo-alignment layer is used inside a liquid crystal panel to align the switchable liquid crystals, the alignment property of the photo-alignment layer has to be maintained over the lifetime of the display since the liquid crystal material has to be realigned each time it has been switched due to interaction with an applied electrical field. In case of anisotropic optical films the liquid crystals are cross-linked after they have been aligned by the photoalignment layer. Specific embodiments can, for example, be found in U.S. Pat. No. 6,717,644.

Compared to conventional alignment of liquid crystals by brushed surfaces, the photo-alignment technique has many advantages, such as high reproducibility, alignment patterning and suitability for roll to roll manufacturing. In addition, photoalignment can be applied on curved surfaces, such as lenses, since the light which generates the alignment in the photo-alignment layers can follow the surface modulation, which is not the case for most of the alternative alignment methods. In the state of the art photo-alignment technique thin layers of photo-alignment materials are applied to a substrate, such as a glass plate or a plastic foil. Since the alignment information is transferred by the surface of the alignment layers, its thickness is less important and device manufacturers choose low thickness to reduce material costs. A typical thickness of photo-alignment layers in the state of the art is around 100 nm or less. This is in particular the case for application as alignment layers in LCDs, where thicker layers have the disadvantage that they lead to an increase of the effective threshold voltage for switching the LCD.

As long as the substrates are flat or slightly curved there are different standard coating techniques which can be used to homogeneously apply the photo-alignment layer. However, if a photo-alignment layer has to be applied to a substrate comprising smaller structures, for example microstructures, such as micro lenses or micro-prisms, or structures exhibiting abrupt changes of the shape, such as rectangular structures, coating of a thin homogeneous layer is more complex and depending on the specific application, may even be impossible.

A further drawback of the state of the art photo-alignment technique is that the substrates which are used as a support for materials which need to be aligned, such as liquid crystals, have first to be coated with a thin photo-alignment layer, which increases costs and manufacturing time and reduces the production yield.

SUMMARY OF THE INVENTION

The goal of the present invention is to provide a solution, which overcomes above mentioned drawbacks of the state of the art photo-alignment technique.

The invention includes a method for manufacturing a photo-alignable object. The invention further provides compositions for the manufacturing of a photo-alignable object. The invention also provides different embodiments of photo-alignable objects as well as devices incorporating such objects.

In the method according to the invention an object is manufactured from a material composition, which comprises a photo-alignable material. The method of the invention differs from that of the state of the art photo-alignment technique that the object itself is photo-alignable and an additional deposition of a thin photo-alignment layer is not required. This has the advantage that the number of coating steps is reduced, which increases yield in production.

Accordingly, a method of the invention for preparation of a photo-alignable object comprises the steps of
providing a material composition comprising a photo-alignable material
generation of an object from the material composition.

The material composition may consist of the photo-alignable material alone or it may comprise additional substances. Preferably, the material composition comprises at least one photo-alignable material and at least one additional substance, wherein the materials are so selected that in an object prepared from the composition phase separation can occur, such that the concentration of at least one sort of photo-alignable material is higher at least at one surface of the object than in the bulk of the object.

An object in the meaning of this application can have any form or shape. For example, it may be a body with complex surfaces. In a preferred embodiment, the object is a flexible foil. In another preferred embodiment, the object comprises topographical surface structures, such as microstructures like microlenses or microprisms, or structures exhibiting abrupt changes of the shape, such as rectangular structures.

The object may be generated by any suitable method like, extruding, casting, molding, 2D- or 3D-printing or coating.

BRIEF DESCRIPTION OF THE DRAWINGS

The invention is further illustrated by the accompanying drawing figures. It is emphasized that the various features are not necessarily drawn to scale.

DETAILED DESCRIPTION OF THE INVENTION

According to a first aspect of the invention there is provided a method for manufacturing a photo-alignable object.

In the context of the present application a photo-alignable object shall mean an object, which comprises a photo-alignable material.

The method of the invention for preparation of a photo-alignable object comprises the steps of
- providing a material composition comprising a photo-alignable material
- generation of an object from the material composition An object according to the invention may have any form. For example, an object may have the form of a sphere, a cube, a cylinder, a tube, a sleeve, a foil, a lens, an ellipsoid, a cuboid, a torus, a cone, a wedge, a pyramid or a prism. An object may be flat or curved, rigid or flexible. Although the above examples of objects are only basic geometrical forms, which were chosen to illustrate the scope of the invention, the term object shall include any other object, which may have much more complex shapes and surfaces.

The object may, for example, be a free standing film. A free standing film may be prepared directly, for example, by extrusion, or the object made from the material composition may be generated as a film on a support, which in a further step it is removed from the support.

Figure 2:
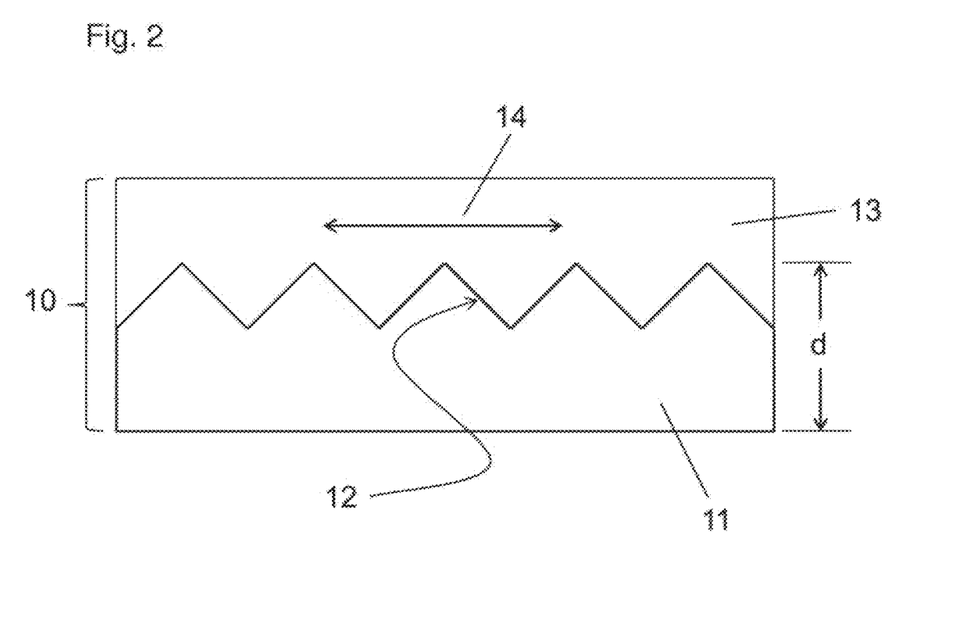
FIG. 2 shows an application, in which a photo-alignable object with a surface structure has been used to align a slave material on top.

To characterize the dimension of an object according to the invention, the thickness of the object shall be defined as the maximum thickness along the thickness direction of the object. The thickness direction shall be the direction of the smallest dimension of the object. For example, in case of a foil, the thickness direction is perpendicular to the foil surface. In case the object has a topographical surface structure along the thickness direction, the thickness shall be measured up to the top of the structure, as this is indicated in FIG. 2 by the thickness d of the object 11.

The thickness of an object according to the invention is larger than 200 nm. Preferably, the thickness of the object is larger than 500 nm, more preferable larger than 2 µm and most preferable larger than 10 µm. For some applications, for example, if the object is intended not to be on a support during or after its manufacture, the thickness of the object is preferably larger than 50 µm, more preferable larger than 200 µm and most preferable larger than 1 mm.

In the context of the present application, a "photo-alignable material" is a material in which anisotropic properties can be induced upon exposure to aligning light. Analogously, a "photo-alignable object" is an object in which anisotropic properties can be induced upon exposure to aligning light. In addition, the terms "photo-aligned material" and "photo-aligned object" are used to refer to photo-alignable materials and photo-alignable objects that have been aligned by exposure to aligning light.

In the context of the present application, the term "aligning light" shall mean light, which can induce anisotropy in a photo-alignable material and which is at least partially linearly or elliptically polarized and/or is incident to the surface of a photo-alignable material from an oblique direction. Preferably, the aligning light is linearly polarized with a degree of polarization of more than 5:1. Wavelengths, intensity and energy of the aligning light are chosen depending on the photosensitivity of the photo-alignable material. Typically, the wavelengths are in the UV-A, UV-B and/or UV-C range or in the visible range. Preferably, the aligning light comprises light of wavelengths less than 450 nm. More preferred is that the aligning light comprises light of wavelengths less than 420 nm.

If the aligning light is linearly polarized, the polarization plane of the aligning light shall mean the plane defined by the propagation direction and the polarization direction of the aligning light. In case the aligning light is elliptically polarized, the polarization plane shall mean the plane defined by the propagation direction of the light and by the major axis of the polarization ellipse.

The terms "anisotropic" and "anisotropy" may, for example, refer to the optical absorption, the birefringence, the electrical conductivity, the molecular orientation, the property for alignment of other materials, for example for liquid crystals, or mechanical properties, such as the elasticity modulus. In the context of this application the term "alignment direction" shall refer to the symmetry axis of the anisotropic property.

The generation of an object from a material composition comprising a photo-alignable material may be done by any suitable method, such as casting, molding, including injection molding and pressure molding, or extrusion, 2D- or 3D-printing and coating. Suitable coating methods are, for example: spin-coating, blade coating, knife coating, kiss roll coating, cast coating, slot-orifice coating, calendar coating, die coating, dipping, brushing, casting with a bar, roller-coating, flow-coating, wire-coating, spray-coating, dip-coating, whirler-coating, cascade-coating, curtain-coating, air knife coating, gap coating, rotary screen, reverse roll coating, gravure coating, metering rod (Meyer bar) coating, slot die (Extrusion) coating, hot melt coating, roller coating, flexo coating. Suitable printing methods include: silk screen printing, relief printing such as flexographic printing, ink jet printing, intaglio printing such as direct gravure printing or offset gravure printing, lithographic printing such as offset printing, or stencil printing such as screen printing.

The object may be manufactured by depositing the material composition comprising the photo-alignable material on a support, which may be flat or is a mold of any form.

The support may be rigid or flexible. In principle it may consist of any material. Preferably, the support comprises plastic, glass or metal or is a silicon wafer. In case the support is flexible, it is preferred that the support is a plastic or metal foil. Preferably, the surface of the support on which the material composition is deposited has a topographical surface structure. Topographical surface structures are, for example, lenses, such as Fresnel and lenticular lenses as well as lens arrays, including microlenses; prisms, including microprisms; gratings and structures with rectangular or triangular cross-sections. The structures may be periodic or non-periodic.

The support may be moving during the deposition of the material composition comprising the photo-alignable material. For example, an object of the material composition may be produced in a continuous roll by roll process by depositing the material composition onto a moving flexible foil, which is preferably plastic or metallic. The resulting film may then be wound on a roll together with the support foil or the object may be released from the support and is then wound as a free standing film, without the support.

Instead of depositing the material composition on a support, a photo-alignable object of a fixed cross-sectional profile may be generated by an extrusion process. Objects generated by extrusion may, for example, be flat or tubular films. The objects can then be cut at length or wound up on a roll.

Preferred methods of the invention further comprise steps for generating surface structures in the photo-alignable object. Typical structures are, for example, lenses, such as Fresnel and lenticular lenses as well as lens arrays, including microlenses; prisms, including microprisms; gratings and structures with rectangular or triangular cross-sections. The exemplary types of structures mentioned above shall also include the inverse structure profiles, which are in particular used if the structure is intended to be replicated into another material. The structures may be periodic or non-periodic. The term structure element shall refer to the smallest element of a structure that may characterize the structure. For example, if the structure comprises microlenses, such as a microlens array, then the structure element is a microlens. In case of a periodic structure, the structure element is the unit which is repeated periodically. The azimuthal dimension of structure elements may cover the range from 100 nm up to the size of the object. Preferably, the smallest width of a structure element according to the invention is larger than 500 nm, more preferred larger than 5 μm and most preferred larger than 50 μm. The structure depth may be in the range from 10 nm to several centimeters. Preferably, the depth of the structure is larger than 100 nm, more preferred larger than 1 μm and most preferred larger than 10 μm.

In one preferred method of the invention for generating photo-alignable objects with surface structures, the material composition comprising a photo-alignable material is casted to a mold which provides the corresponding structure and in a later step the object generated from the composition comprising a photo-alignable material is removed from the mold.

In another preferred method of the invention for generating photo-alignable objects with surface structures, the structure is embossed into the surface of a photo-alignable object, during or after preparation of the object, using an embossing tool which provides the corresponding structure.

Further methods for generating surface structures make use of photo-lithography and etching, laser ablation, self-organization of the material or deposition of the material composition in the required form, for example by a printing process, such as ink jet printing or 3D-printing.

For generation of anisotropy in any of the photo-alignable objects described above, the method may comprise the step of exposing the photo-alignable object to aligning light to convert the photo-alignable object into a photo-aligned object.

In a preferred variant of the methods described above, a slave material is applied on the surface of a photo-aligned object. Preferably, the slave material is a liquid crystal polymer (LCP) material. The slave material may be applied by coating and/or printing with or without solvent and may be applied over the full object area of the object or only on parts of it. The slave material shall cover at least parts of object but does not have to be applied over the entire area of it. Preferably, the method involves heating the slave material before or after applying it to the object. The method may also comprise initiating polymerization in the slave material by thermal treatment or exposure to actinic light. Depending on the nature of the slave material, it may be helpful to perform the polymerization under inert atmosphere, such as nitrogen, or under vacuum. The slave material may contain isotropic or anisotropic dyes and/or fluorescent dyes.

In the context of the present application, a "slave material" shall refer to any material that has the capability to establish anisotropy upon contact with a photo-aligned material. The nature of the anisotropy in the photo-aligned material and in the slave material may be different from each other. For example, the slave material may exhibit light absorption anisotropy for visible light and therefore can act as a polarizer, whereas the anisotropy of the photo-aligned material may only be related to the molecular orientation. There may also be moieties of the photo-alignable material, for example in a co-polymer, which are not sensitive to aligning light, but create anisotropic properties because of interaction with the photo-sensitive moieties, which undergo a photo-reaction upon exposure to aligning light. Such a material exhibits properties of a photo-alignable material and of a slave material, but shall be included in the meaning of a photo-alignable material.

A slave material may comprise polymerizable and/or non-polymerizable compounds. Within the context of the present application the terms "polymerizable" and "polymerized" shall include the meaning of "cross-linkable" and "cross-linked", respectively. Likewise, "polymerization" shall include the meaning of "cross-linking".

Preferably, the slave material is a self-organizing material. More preferred is that the slave material is a liquid crystal material and in particular preferred is that the slave material is a liquid crystal polymer material.

A liquid crystal polymer (LCP) material as used within the context of this application shall mean a liquid crystal material, which comprises liquid crystal monomers and/or liquid crystal oligomers and/or liquid crystal polymers and/or cross-linked liquid crystals. In case the liquid crystal material comprises liquid crystal monomers, such monomers may be polymerized, typically after anisotropy has been created in the LCP material due to contact with a photo-aligned material. Polymerization may be initiated by thermal treatment or by exposure to actinic light, which preferably comprises uv-light. A LCP-material may consist of a single type of a liquid crystal compound, but may also be a composition of different polymerizable and/or non-polymerizable compounds, wherein not all of the compounds have to be liquid crystal compounds. Further, an LCP material may contain additives, for example, a photo-initiator or isotropic or anisotropic fluorescent and/or non-fluorescent dyes.

According to a second aspect of the invention there is provided a photo-alignable object.

The object may have any form; it may be in the form of a flexible foil, but may also be rigid with any kind of shape. The object may be part of a device, for example as a layer in a stack of layers of different materials, which may have been produced one after the other.

Anisotropy is generated in the photo-alignable object by exposing it to aligning light. The anisotropy induced in a photo-alignable object may then further be transferred to a slave material, which is brought in contact with the surface of the object, for example by a printing, coating or casting method, which include, but are not limited to: spin-coating, blade coating, knife coating, kiss roll coating, cast coating, slot-orifice coating, calendar coating, die coating, dipping, brushing, casting with a bar, roller-coating, flow-coating, injection-molding, wire-coating, spray-coating, dip-coating, whirler-coating, cascade-coating, curtain-coating, air knife coating, gap coating, rotary screen, reverse roll coating, gravure coating, metering rod (Meyer bar) coating, slot die (Extrusion) coating, hot melt coating, roller coating, flexo coating, silk screen printer, relief printing such as flexographic printing, ink jet printing, 3D-printing, intaglio printing such as direct gravure printing or offset gravure printing, lithographic printing such as offset printing, or stencil printing such as screen printing.

Preferred applications include the use as alignment surface for switchable liquid crystals in LCDs as well as for slave materials, for example, for making optical retarders or polarizing films, which may comprise an orientation pattern.

In a preferred embodiment of this invention, the photo-alignable object has a topographical surface structure. The structure may comprise microelements or arrays of microelements. Typical structures are, for example, lenses, such as Fresnel and lenticular lenses as well as lens arrays, including microlenses; prisms, including microprisms; gratings and structures with rectangular or triangular cross-sections. The structures may be periodic or non-periodic. The exemplary types of structures mentioned above shall also include the inverse structure profile, which are in particular used if the structure is intended to be replicated into another material. The azimuthal dimension of structure elements may cover the range from 100 nm up to the size of the object. Preferably, the smallest width of a structure element according to the invention is larger than 500 nm, more preferred larger than 5 µm and most preferred larger than 50 µm. The structure depth may be in the range from 10 nm to several centimeters. Preferably, the depth of the structure is larger than 100 nm, more preferred larger than 1 µm and most preferred larger than 10 µm.

Photo-alignable objects with a topographical surface structure may be similarly photo-aligned as this is done in the state of the art technique and may be used to align slave materials, such as switchable liquid crystals in LCDs or LCP materials, the latter allowing to make optical retarders or polarizers. As the surface structure of the object will be formed into the slave material, the boundary of the slave material at the object side will also be topographically structured. Therefore, the optical properties of the slave material will be spatially modulated according to the surface structure. Typical structures replicated in this way are, for example, lenses, such as Fresnel and lenticular lenses as well as lens arrays, including microlenses; prisms, including microprisms; gratings and structures with rectangular or triangular cross-sections. The structures may be periodic or non-periodic. This enables new applications for optical elements, such as for optically anisotropic lenses in autostereoscopic 3D Displays, as part of a system for switching between 2D and 3D mode. Other applications include brightness enhancement films for LCDs, light out-coupling arrays for LCDs and organic light emitting devices (OLED) for displays or lighting as well as optical security elements.

Figure 1:
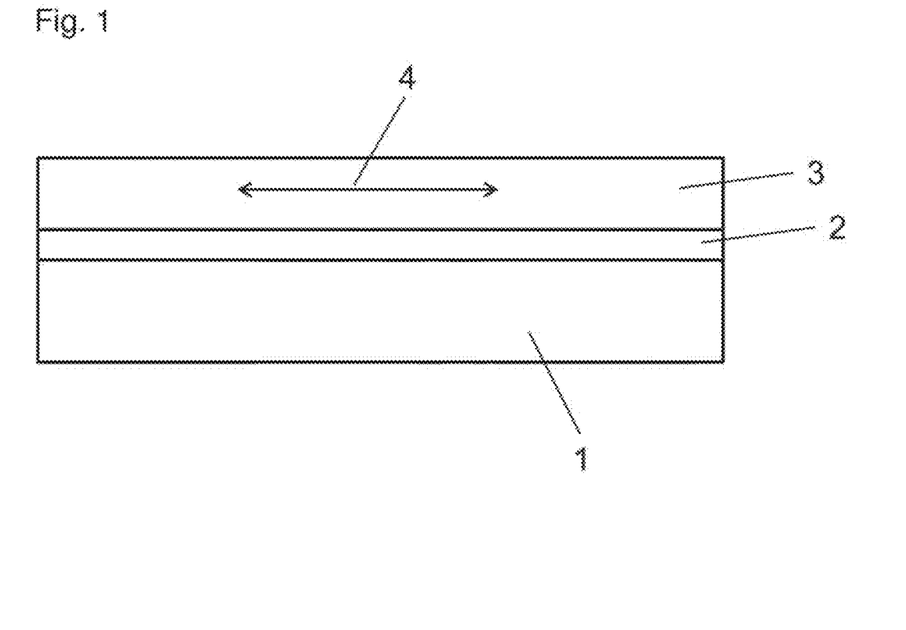
FIG. 1 depicts an example of the state of the art photo-alignment technique, where a thin photo-alignment layer is applied to a support.

FIG. 1 shows an example of a device which is based on state of the art photo-alignment technique. In this technique a photo-alignable material is deposited as a thin layer 2 on a substrate 1. Upon exposing the layer of photo-alignable material to aligning light, aligning capabilities are generated in this layer. After coating a liquid crystal layer 3 on top of the photo-aligned material, the liquid crystal material uniformly aligns according to the direction 4 defined by the aligning light.

In the example of FIG. 2 the device 10 is based on a photo-alignable object 11 according to the invention, which comprises a surface structure 12. Upon exposing the photo-alignable object to aligning light, aligning capabilities are generated at the surface of the structure of the object. After coating a liquid crystal layer 13 on top of the photo-aligned object, the liquid crystal material in average aligns according to the direction 14 defined by the aligning light.

According to a third aspect of the Invention there is provided a device containing a photo-aligned object.

A device according to the invention comprises a slave material, which has been aligned by a photo-aligned object. The slave material may have been removed from the photo-aligned object after alignment in the slave material has been established. Preferably, the slave material is an LCP material. The device is preferably transparent for visible light with a light transmission rate higher than 60%, more preferred higher than 80%. The slave material may contain isotropic or anisotropic dyes and/or fluorescent dyes. Preferred devices according to the invention further comprise a metallic or non-metallic reflector. The device preferably comprises one or more layers for protecting the device against mechanical of electromagnetic impact.

In a preferred embodiment of the invention, the slave material has at least one surface which is topographically structured and is or was in contact with the photo-aligned object. Typical topographical structures are, for example, lenses, such as Fresnel and lenticular lenses as well as lens arrays, including microlenses; prisms, including microprisms; gratings and structures with rectangular or triangular cross-sections. The structures may be periodic or non-periodic. Preferably, the topographical structure supports optical focusing.

As an example, FIG. 6 illustrates a method of making optically anisotropic lenticular lenses. FIG. 6a shows a mold 50 providing a surface profile 51 desired for lenticular lenses. In principal any material, such as metal or polymer, can be used for the mold. A material composition 52 comprising a photo-alignable material is deposited in the mold by a suitable method, such as casting (FIG. 6b). Depending on the kind of the material composition 52, a heating and/or uv-curing step may be applied in order to solidify it. Subsequently, the obtained photo-alignable object 53 can be removed from the mold. As shown in FIG. 6c, the resulting photo-alignable object 53 has a surface profile 54, which is inverse to the surface profile of a lenticular lens array, which is because the surface structure of the mold has been replicated into the object 53. The photo-alignable object 53 is then exposed to aligning light to convert it into a photo-aligned object with an aligning direction indicated by the arrow 55. Subsequently, a LCP material is deposited on the photo-aligned object 53, such that it fills the surface structure 54, as shown in FIG. 6d. Depending on the LCP material properties, thermal treatment and/or uv-curing may be required to align the liquid crystal molecules and to solidify the LCP. The resulting LCP layer has the form of a lenticular lens array 56. The orientation direction 57 of the liquid crystal molecules is parallel to the alignment direction 55 generated in the photo-aligned object 53. The optical properties of object 53 and that of the LCP material may be selected such that the lenticular lenses 56 and the object 53 together form an optical device 58. Because the liquid crystal molecules are uniaxially aligned, the LCP layer is birefringent. The refractive index of the LCP along the alignment direction corresponds to the extraordinary refractive index $n_o$, whereas the refractive index perpendicular to the alignment direction corresponds to the ordinary refractive index $n_o$. In a preferred embodiment of the invention, the refractive index of the object 53 is chosen to be about the same as one of the two refractive indices $n_e$ and $n_o$. If, for example, the refractive index of the object is identical the ordinary refractive index $n_o$ of the LCP layer, and consequently is different from the extraordinary refractive index $n_e$, then the optical property of the device 58 for polarized light depends on the polarization direction of the light. For polarized light with a polarization direction parallel to the orientation direction 57, there will be a refractive index step at the boundary between object 55 and the LCP material. Therefore, the device 58 will operate like a lenticular lens array in correspondence with the geometry and the related refractive indices. For polarized light with a polarization direction perpendicular to the orientation direction 57, however, there will be no refractive index difference at the boundary between object 55 and the LCP material and the light will not be refracted. Hence, depending on the polarization direction of the light, the lens array is active or not active. In combination with an additional optical element, which can rotate the polarization plane of light by 90°, such as a liquid crystal cell, the lens array device 58 can be switched between active and not active.

In a preferred embodiment the device comprises optically anisotropic lenses.

Devices according to the invention can, for example, be used in autostereoscopic 3D Displays, as part of a system for switching between 2D and 3D mode. Other applications include brightness enhancement films for LCDs, light outcoupling arrays for LCD and organic light emitting devices (OLED), like displays or OLED lighting applications. Further devices according to the invention may be used as part of backlight units for LCDs. Preferably, devices according to the invention are used in optical security elements.

According to a fourth aspect of the invention there is provided a composition for the manufacturing of a photo-alignable object.

The material composition comprising a photo-alignable material may comprise more than one type of photo-alignable materials.

The material composition comprising a photo-alignable material may comprise additional substances which do not comprise photo-alignable moieties. Such substances include polymers, dendrimers, oligomers, prepolymers and monomers, which may be polymerized during or after the manufacturing of the object. Examples of classes of suitable polymers are, but not limited to: polyalkylenes, such as polyethylene, polypropylene, polycycloolefine COP/COC, polybutadiene, poly(meth)acrylates, polyester, polystyrene, polyamide, polyether, polyurethane, polyimide, polyamide acid, polycarbonate, poly-vinylalcohol, poly-vinylchloride, cellulose and cellulose derivatives such as cellulose triacetate. Examples of suitable classes of monomers are: mono and multifunctional (meth)acrylates, epoxies, isocyanate, allyl derivatives and vinyl ethers.

Preferably, a photo-alignable object according to the invention does not have a liquid crystal phase above 20° C., more preferable it does not have a liquid crystal phase above 10° C. The reason is that liquid crystals establish alignment by self organization, typically in small domains. Photo-alignment would have to compete with the random liquid crystal alignment and would require long exposure to polarized uv-light and/or heating the object to a temperature above the clearing temperature of the liquid crystal material, to perform the photo-alignment process in the isotropic phase of the material, where the liquid crystals have no order anymore. In any way this would complicate the alignment process. According to the above, it is preferred that the material composition comprising a photo-alignable material, without any solvents that may be removed after forming an object, does not have a liquid crystal phase above 20° C., more preferred not above 10° C. On the other hand, it is preferred that the individual substances of the material composition comprising a photo-alignable material do not exhibit a liquid crystal phase above 20° C., more preferred not above 10° C.

The term substances with regard to the material composition comprising a photo-alignable material shall not include solvents, which may be used for preparation of the composition and of the object and which will later be removed, for example by drying. In other words, the meaning of the term substances includes only those compounds which remain in the final object.

In particular, the material composition comprising a photo-alignable material may contain additives for improving adhesion.

Further, the material composition comprising a photo-alignable material may contain isotropic or anisotropic dyes and/or fluorescent dyes.

Depending on the type of materials in the composition, phase separation between the photo-alignable material and the other substances may occur. By proper choice of the material composition it is possible to control phase separation such that upon manufacturing an object most of the photo-alignable material separates to the surface of the object. This further allows to reduce the amount of photo-alignable material in the composition. Preferably, the percentage by weight of the sum of the photo-alignable materials in the composition is less than 50%, more preferable less than 20% and most preferably less than 10%. Depending on the thickness of the object that was made with the material composition, the amount of photo-alignable material may be less than 1 wt % or even less than 0.1 wt %. In extreme cases 0.01 wt % of photo-alignable material is enough to still achieve sufficient alignment properties. Preferably, the photo-alignable material comprises fluorinated and/or siloxane moieties and/or is a polysiloxane, in order to support phase separation.

In a preferred embodiment, a composition according to the invention comprises a photo-alignable material and another substance, which may be photo-alignable or not. Both, the photo-alignable material and the other substance may be a polymer, a dendrimer, a oligomer, a prepolymer or a monomer. The photo-alignable material and the other substance are so selected that the monomer dipole moments of the photo-alignable material and the other substance are different from each other. The monomer dipole moment shall refer to the dipole moment of a monomer or in case of polymers, oligomers and prepolymers to the dipole moment of monomeric units of such polymers, oligomers and prepolymers, respectively. Preferably, the monomer dipole moments differ by more than 0.5 Debye, more preferably by more than 1 Debye and most preferred by more than 1.5 Debye. The composition may contain additional photo-alignable or non-photo-alignable substances.

A photo-alignable material for a composition for manufacturing an object according to the invention may be any kind of photo-sensitive material in which anisotropic properties can be created upon exposure to aligning light, independent from the photo-reaction mechanism. Therefore, suitable photo-alignable materials are, for example, materials in which upon exposure to aligning light the anisotropy is induced by photo-dimerization, photo-decomposition, trans-cis isomerization or photo-fries rearrangement. Preferred photo-alignable materials are those, in which upon exposure to aligning light the created anisotropy is such that slave materials in contact with the photo-aligned material can be oriented. Preferably, such slave material is a liquid crystal material, in particular a LCP-material.

Photo-alignable materials, as those described above, incorporate photo-alignable moieties, which are capable of developing a preferred direction upon exposure to aligning light and thus creating anisotropic properties. Such photo-alignable moieties preferably have anisotropic absorption properties. Typically, such moieties exhibit absorption within the wavelength range from 230 to 500 nm. Preferably, the photo-alignable moieties exhibit absorption of light in the wavelength range from 300 to 450 nm, more preferred are moieties, which exhibit absorption in the wavelength range from 350 to 420 nm.

Preferably the photo-alignable moieties have carbon-carbon, carbon-nitrogen, or nitrogen-nitrogen double bonds.

For example, photo-alignable moieties are substituted or un-substituted azo dyes, anthraquinone, coumarin, mericyanine, 2-phenylazothiazole, 2-phenylazobenzthiazole, stilbene, cyanostilbene, fluorostibene, cinnamonitrile, chalcone, cinnamate, cyanocinnamate, stilbazolium, 1,4-bis(2-phenylethylenyl)benzene, 4,4'-bis(arylazo)stilbenes, perylene, 4,8-diamino-1,5-naphthoquinone dyes, aryloxycarboxylic derivatives, arylester, N-arylamide, polyimide, diaryl ketones, having a ketone moiety or ketone derivative in conjugation with two aromatic rings, such as for example substituted benzophenones, benzophenone imines, phenythydrazones, and semicarbazones.

Preparation of the anisotropically absorbing materials listed above are well known as shown, e.g. by Hoffman et al., U.S. Pat. No. 4,565,424, Jones et al., in U.S. Pat. No. 4,401,369, Cole, Jr. et al., in U.S. Pat. No. 4,122,027, Etzbach et al., in U.S. Pat. No. 4,667,020, and Shannon et al., in U.S. Pat. No. 5,389,285.

Preferably, the photo-alignable moieties comprise arylazo, poly(arylazo), stilbene, cyanostilbene, cinnamate or chalcone.

A photo-alignable material may have the form of a monomer, oligomer or polymer. The photo-alignable moieties can be covalently bonded within the main chain or within a side chain of a polymer or oligomer or they may be part of a monomer. A photo-alignable material may further be a copolymer comprising different types of photo-alignable moieties or it may be a copolymer comprising side chains with and without photo-alignable moieties.

Polymers denotes for example to polyacrylate, polymethacrylate, polyimide, polyurethane, polyamic acids, polymaleinimide, poly-2-chloroacrylate, poly-2-phenylacrylate; unsubstituted or with $C_1$-$C_6$alkyl substituted poylacrylamide, polymethacyrlamide, poly-2-chloroacrylamide, poly-2-phenylacrylamide, polyether, polyvinylether, polyester, polyvinylester, polystyrene-derivatives, polysiloxane, straight-chain or branched alkyl esters of polyacrylic or polymethacrylic acids; polyphenoxyalkylacrylates, polyphenoxyalkylmethacrylates, polyphenylalkylmeth-acrylates with alkyl residues of 1-20 carbon atoms; polyacrylnitril, polymethacrylnitril, cycloolephinic polymers, polystyrene, poly-4-methylstyrene or mixtures thereof.

A photo-alignable material may also comprise photosensitizers, for example, ketocoumarines and benzophenones.

Further, preferred photo-alignable monomers or oligomers or polymers are described in U.S. Pat. Nos. 5,539,074, 6,201,087, 6,107,427, 6,632,909 and 7,959,990.

EXAMPLES

Syntheses of Photo-Alignment Polymers

Preparation Example A1 4,4,4-trifluorobutyl (E)-3-(4-hydroxyphenyl)prop-2-enoate 164.16 g of p-coumaric acid are dissolved in 1000 ml of N-methyl-2-pyrrolidone. 152.54 g of 1,8-diazabicyclo[5,4,0]undec-7-ene are slowly added, followed by 237.99 g of 1,1,1-trifluoro-4-iodobutane. The brownish solution is heated under stirring to 70° C. and kept for 2 h at this temperature. HPLC analysis shows still presence of unreacted coumaric, additional 47.60 g of trifluoro-iodobutane are added and the reaction continued for another 2 h at 700° C.

The reaction mixture is then diluted with 5000 ml of ethyl acetate and 5000 ml of aqueous 5% hydrochloric acid solution are added. The two-phase mixture is stirred at room temperature for 10 minutes, the aqueous phase is removed. The organic phase is washed with 5000 ml of aqueous 5% sodium bicarbonate solution and 5000 ml of aqueous 10% sodium chloride solution. The remaining organic phase is diluted with 3000 ml of toluene and partly concentrated by distilling off the solvents under vacuum to leave 762 g of a brown liquid product containing some salt residues, which are removed by filtration. Further distillation provides 437 g of a liquid crude product. 400 ml of heptane are slowly added at ca. 70° C. and the mixture crystallized by cooling to room temperature and finally to 0° C. The crystalline precipitate is filtered off, washed with a solvent mixture toluene/heptane=1/1 (v/v) and dried under vacuum at 40° C. to constant weight.

231.7 g of crystalline trifluorobutyl ester A1 are obtained, with an HPLC purity of 99.71% area.

Preparation Example A2 4,4,4-trifluorobutyl (E)-3-[4-(6-hydroxyhexoxy)phenyl]prop-2-enoate 231.00 g of trifluorobutyl ester A1 are dissolved in 1100 ml dimethylformamide. 138.69 g of 6-chloro-1-hexanol are added, followed by 151.98 g of finely pulverized potassium carbonate and 14.04 g of pulverized potassium iodide. The yellow-brown suspension is heated to 100° C. and stirred for 3 h at this temperature. HPLC analysis shows less than 0.5% remaining A1. The yellow suspension is cooled to room temperature, the solid salts are filtered off and the clear filtrate is diluted with 5000 ml of ethyl acetate, washed with 5000 ml of aqueous 5% hydrochloric acid solution, then with 5000 ml of aqueous 5% sodium bicarbonate solution and finally with 5000 ml of aqueous 10% sodium chloride solution. The organic phase is diluted with 2000 ml of toluene and partly concentrated by distilling off the solvents under vacuum to give a brown liquid product containing some salt residues, which are removed by filtration. Further distillation provides 500 g of a liquid crude product. 400 ml of heptane are slowly added at ca. 70° C. and the mixture crystallized by cooling to room temperature, leading to a thick, crystalline mass. Cooling is continued to 0° C. and the crystalline precipitate is filtered off, washed with heptane and dried under vacuum at room temperature to constant weight.

283.6 g of crystalline product A2 are obtained with an HPLC purity of 96% area.

Preparation Example A3 6-[4-[(E)-3-oxo-3-(4,4,4-trifluorobutoxy)prop-1-enyl]phenoxy]hexyl 2-methylprop-2-enoate 112.32 g of the product A2 are dissolved in 600 ml of toluene. 12.09 g of 4-(dimethylamino) pyridine are added, followed by 0.27 g of 2,6,-Di-tert-butyl-4-methylphenol and 36.16 g of methacrylic acid. The resulting yellow solution is cooled to 0° C. and a solution of 86.66 g of N,N'-dicyclohexyl carbodiimide in 100 ml of toluene is slowly added. After stirring at 0° C.-10° C. for 1 h, the cooling bath is removed and the reaction mixture is stirred overnight at room temperature.

The suspension is treated with 500 ml of aqueous 5% sodium bicarbonate solution for 30 minutes at room temperature. The aqueous phase is removed. The organic phase is once washed with 200 ml of aqueous 5% hydrochloric acid solution and once with 200 ml of aqueous 10% sodium chloride solution. The organic phase is filtered and partly concentrated by distilling off the solvents under vacuum. The liquid residue is filtrated and the filtrate is further concentrated to a final volume of 200 ml-250 ml. 200 ml of heptane are added and the mixture is cooled to ca. −10° C. The formed crystalline precipitate is separated by filtration, washed with cold heptane and dried under vacuum below room temperature.

105.33 g of crystalline monomer A3 are obtained with an HPLC purity of 97.3% area.

Preparation Example A4 Poly-6-[4-[(E)-3-oxo-3-(4,4,4-trifluorobutoxy)prop-1-enyl]phenoxy]hexyl 2-methylprop-2-enoate $[C_{23}H_{29}F_3O_5]_n$
$[442.48]_n$ 25.00 g of monomer A3 are dissolved in 187 ml N-methyl-2-pyrrolidone. The nearly colourless solution is purged by applying 5 cycles of vacuum followed by purging with nitrogen. The solution is then heated to 65±1° C. and when this temperature is reached, a solution of 0.125 g 2,2'-Azobis(2-methylpropionitrile) in 19 ml of N-methyl-2-pyrrolidone, purged the same way, is added. Polymerization is continued for 6 hours at 65±1° C. under stirring and then cooled to room temperature.

The solid polymer is isolated by dropping the polymer solution into 1500 ml of cooled (−10° C.) methanol under vigorous stirring. The precipitate is filtered off while still cold and dried under vacuum at room temperature.

Polymer A4 is obtained with Mw of 92164 and Mw of 26774.

Preparation Example A5 Poly-6-[4-[(E)-3-oxo-3-(4,4,4-trifluorobutoxy)prop-1-enyl]phenoxy]hexyl 2-methylprop-2-enoate 25.00 g of monomer A3 are dissolved in 234 ml of toluene. The nearly colourless solution is well purged by applying 5 cycles of vacuum followed by purging with nitrogen. It is heated to 65±1° C. and when this temperature is reached the solution of 0.13 g 2,2'-Azobis(2-methylpropionitrile) in 26 ml toluene, purged the same way, is added. Polymerization is continued for 20 hours at 65±1° C. internal temperature under stirring. A second portion of 0.13 g AIBN, dissolved in little toluene, is added and the temperature increased to 75° C. Polymerization is continued for a further 20 hours. A third portion of 0.13 g AIBN is added and polymerization continued for 20 hours at 75° C. A fourth portion of 0.13 g AIBN is added and polymerization continued for 20 hours. The resulting polymer solution can be used as is or the solid polymer A5 can be isolated in the form of a sticky resin by evaporation of the solvents, with Mw of 19989 and Mn of 11700.

Preparation Example A6: Copolymer of 6-[4-[(E)-3-oxo-3-(4,4,4-trifluorobutoxy)prop-1-enyl]phenoxy]hexyl 2-methylprop-2-enoate and 6-[4-[(E)-3-methoxy-3-oxo-prop-1-enyl]phenoxy]hexyl 2-methylprop-2-enoate $[C_{23}H_{29}F_3O_5]_n$
$[442.48]_n$ $[C_{20}H_{26}O_5]_n$
$[346.43]_n$ 14.00 g of monomer A3 and 11.00 g of monomer 6-[4-[(E)-3-methoxy-3-oxo-prop-1-enyl]phenoxy]hexyl 2-methylprop-2-enoate [439661-46-8] are dissolved in 187 ml of N-methyl-2-pyrrolidone. The solution is well purged by applying 5 cycles of vacuum followed by purging with nitrogen. The solution is then heated to 65±1° C. and when this temperature is reached the solution of 0.127 g 2,2'-Azobis(2-methylpropionitrile) in 19 ml N-methyl-2-pyrrolidone, purged the same way, is added. Polymerization is continued for 6 hours at 65±1° C. internal temperature under stirring and then cooled to room temperature.

The solid polymer is isolated by dropping the polymer solution into 1500 ml of cooled (−10° C.) methanol under vigorous stirring. The precipitate is filtered off while still cold and the tough polymer dried under vacuum at room temperature.

Polymer A6 is obtained with Mw of 88374 and Mn of 35338.

Preparation Example A7
(E)-3-(4-acetoxyphenyl)prop-2-enoic acid 164.16 g of p-coumaric acid are dissolved in 500 ml of pyridine and the solution is cooled to 10° C. 270 g of acetic anhydride are added under stirring within 20 minutes at 10-15° C. The reaction mixture is stirred overnight at room temperature. The clear, yellow-brown solution is slowly added to a mixture of 1000 g of ice and 750 ml of 25% hydrochloric acid. The resulting colourless suspension is stirred for 2 h at room temperature. The solid product is filtered off, washed well with plenty of water and vacuum-dried at 40° C. to constant weight. 204.4 g of colourless, crystalline OH-protected coumaric acid A7 are obtained with an HPLC purity of 95.2% area. The product can be further purified by recrystallization in methyl ethyl ketone to the HPLC purity of 98.9% area.

Preparation Example A8 4,4,5,5,5-pentafluoropentyl
(E)-3-(4-acetoxyphenyl)prop-2-enoate A mixture of 51.55 g of OH-protected coumaric acid A7, 53.40 g of 4,4,5,5,5-pentafluoropentanol and 2.50 g of 4-dimethylaminopyridine in 300 ml of dichloromethane is cooled to 0° C. A solution of 61.90 g dicyclohexylcarbodiimide in 50 ml dichloromethane is added under stirring within 15 minutes at 0° C. The white suspension is stirred for another 75 minutes at 0° C. and then overnight at room temperature. The solid DCC urea is filtered off from the suspension and the filtrate is washed once with 200 ml of 5% aqueous hydrochloric acid solution and twice with 200 ml of 10% aqueous sodium chloride solution. After drying the organic phase over sodium sulphate, the solvent is removed by distillation to yield 90 g of OH-protected pentafluoropentyl ester A8 as crystallizing oil with an HPLC purity of 88.8% area. It is directly used for the next step.

Preparation Example A9 4,4,5,5,5-pentafluoropentyl
(E)-3-(4-hydroxyphenyl)prop-2-enoate 89.98 g of OH-protected pentafluoropentyl ester A8 are dissolved in 492 ml of tetrahydrofurane. 49 ml of methanol and 12.3 ml of water are added to the solution, followed by 6.90 g of pulverized potassium carbonate. The suspension is stirred and heated at 60° C. for 2.5 h. 800 ml of ethyl acetate are added and the solution is washed with 300 ml of 5% aqueous hydrochloric acid solution. The organic phase is washed twice with 300 ml of 10% aqueous sodium chloride solution. After drying the organic phase over sodium sulphate and filtration, the solvent is removed by distillation to yield 80.5 g of pentafluoropentyl ester A9 (containing traces of solvent) as a crystallizing oily product with an HPLC purity of 92.1% area. The product can be recrystallized in toluene/heptane to give an HPLC purity of 94% area.

Preparation Example A10 4,4,5,5,5-pentafluoropentyl (E)-3-[4-(6-hydroxyhexoxy)phenyl]prop-2-enoate 61.37 g of pentafluoropentyl ester A9 are dissolved in 400 ml of dimethylformamide. 31.03 g of 6-chloro-1-hexanol are added, followed by 34.00 g of finely pulverized potassium carbonate and 3.14 g of pulverized potassium iodide. The yellowish suspension is stirred and heated at 100° C. for 3 hours. The yellow suspension is cooled to room temperature, the solid salts are filtered off and the clear filtrate is slowly added to the mixture of 800 ml of water and 200 ml of 25% aqueous hydrochloric acid at a temperature of 5° C. The precipitated product is filtered off and the filter cake washed well with water. It is dissolved in 500 ml of ethyl acetate and the solution washed with 300 ml of 5% aqueous sodium bicarbonate solution and then with 300 ml of 10% aqueous sodium chloride solution. After drying the organic phase with sodium sulphate the filtered solution is evaporated to dryness to yield 80 g of the hydroxyalkylated pentafluoropentyl ester A10 as orange oil with a HPLC purity 91.5% area, which crystallizes in the cold. The product can be recrystallized in toluene/heptane to provide an improved HPLC purity of 94% area.

Preparation Example A11 6-[4-[(E)-3-oxo-3-(4,4,5,5,5-pentafluoropentoxy)prop-1-enyl]phenoxy]hexyl
2-methylprop-2-enoate 56.15 g of hydroxyalkylated pentafluoropentylester A10 are dissolved in 300 ml of toluene. 13.67 g of methacrylic acid, 1.29 g of 4-dimethylaminopyridine and 0.13 g of 2,6-Di-tert-butyl-4-methylphenol are added and brought to solution. After cooling to 0° C., a solution of 32.76 g dicyclohexylcarbodiimide in 50 ml toluene is added under stirring within 15 minutes at 0° C. The white suspension is stirred for another 75 minutes at 0° C. and then overnight at room temperature. 350 ml of 5% aqueous sodium bicarbonate solution is added to the white suspension and stirring continued for 1 h. The suspension is filtered, the filter cake (mainly DCC urea) washed with toluene and the aqueous phase separated. The organic phase is washed with 500 ml of 5% aqueous hydrochloride solution and 500 ml of 10% aqueous sodium chloride solution. After drying the organic phase over sodium sulphate the solution is evaporated to dryness to yield 64.97 g of pentafluoropentyl ester methacrylate A11 as slightly yellowish, crystallizing oil. The resulting crud product is dissolved in 400 ml dichloromethane and filtered through a short column of 100 g silica gel (pore size 60 Angström, 230-400 mesh particle size). The filtrate is evaporated to dryness to yield 55.85 g of colourless, crystalline pentafluoropentyl ester methacrylate A11 with an HPLC purity of 95.4% area.

Preparation Example A12 Poly-6-[4-[(E)-3-oxo-3-(4,4,5,5,5-pentafluoropentoxy)prop-1-enyl]phenoxy]hexyl 2-methylprop-2-enoate

[492.48]$_n$
[C$_{24}$H$_{29}$F$_5$O$_5$]$_n$ 10.00 g of monomer A11 are dissolved in 45 ml of tetrahydrofurane. 0.05 g of 2,2'-Azobis(2-methylpropionitrile are added and the solution is purged by applying 5 cycles of vacuum followed by purging with nitrogen. The solution is stirred under nitrogen for 60 h at 60° C. The solid polymer is isolated by dropping the polymer solution into 500 ml of cooled (−10° C.) methanol under vigorous stirring. The precipitate is filtered off while still cold and dried under vacuum at room temperature.

Polymer A12 is obtained with Mw of 211'546 and Mn 110'369.

Preparation Example A13 (3,4,5-trifluorophenyl) methyl (E)-3-(4-hydroxyphenyl)prop-2-enoate 18.18 g of p-coumaric acid are dissolved in 110 ml of N-methyl-pyrrolidone. 16.90 g of 1,8-diazabicyclo[5,4,0] undec-7ene are dropwise added, followed by 20.00 g of 3,4,5-trifluorobenzylchlorid. The brownish solution is stirred at 70° C. for 3 h, cooled to room temperature and diluted with 500 ml of ethyl acetate. It is extracted with 500 ml of 5% aqueous hydrochloric acid solution, followed by extraction with 500 ml of 5% aqueous sodium bicarbonate solution and 500 ml of water. After drying the organic phase over sodium sulphate the solution is filtered and evaporated to dryness to yield 32.00 g of slightly beige crystalline product. It is recrystallized from toluene to afford 27.02 g of colourless trifluorobenzylester A13 with a purity of 97.7% area (HPLC).

Preparation Example A14 (3,4,5-trifluorophenyl) methyl (E)-3-[4-(6-hydroxyhexoxy)phenyl]prop-2-enoate 29.00 g of trifluorobenzylester A13 are dissolved in 140 ml of dimethylformamide. 15.43 g of 6-chloro-1-hexanol are added, followed by 186.91 g of finely pulverized potassium carbonate and 1.56 g of pulverized potassium iodide. The yellowish suspension is stirred and heated at 100° C. for 3 h. The yellow suspension is cooled to room temperature, the solid salts are filtered off and the clear filtrate is slowly added to the mixture of 800 ml of water and 200 ml of 25% aqueous hydrochloric acid at 5° C. The precipitated product is filtered off and the filter cake well washed with water. It is then dissolved in 400 ml of ethyl acetate and the solution washed with 400 ml of 5% aqueous sodium bicarbonate solution and then with 300 ml of water. After drying the organic phase with sodium sulphate, the filtered solution is evaporated to dryness to yield 40.2 g of brownish oil. The resulting crud product is dissolved in toluene and crystallized by the addition of heptane and cooling to afford 30.48 g colourless hydroxyalkylated coumaric ester A14 with a HPLC purity of 90.7% area.

Preparation Example A15 6-[4-[(E)-3-oxo-3-[(3,4,5-trifluorophenyl)methoxy]prop-1-enyl]phenoxy]hexyl 2-methylprop-2-enoate 30.00 g of hydroxyalkylated coumaric ester A14 are dissolved in 160 ml of toluene. 8.85 g of methacrylic acid, 2.96 g of 4-dimethylaminopyridine and 0.07 g of 2,6-Di-tert-butyl-4-methylphenol are added and brought to solution. After cooling to 0° C., a solution of 21.22 g dicyclohexylcarbodiimide in 27 ml toluene is added under stirring within 15 minutes at 0° C. The white suspension is stirred for another 75 minutes at 0° C. and then overnight at room temperature. 150 ml of 5% aqueous sodium bicarbonate solution is added to the white suspension and stirring continued for 1 h. The suspension is filtered, the filter cake (mainly DCC urea) washed with toluene and the aqueous phase separated. The organic phase is washed with 500 ml of 5% aqueous hydrochloride solution and 500 ml of 10% aqueous sodium chloride solution. After drying the organic phase over sodium sulphate the filtered solution is evaporated to dryness to yield 38.37 g of brownish oil. The resulting crud product is dissolved in 800 ml dichloromethane and filtered through a short column of 200 g silica gel (pore size 60 Angström, 230-400 mesh particle size). The filtrate is evaporated to dryness to yield 26.27 g of colourless, crystalline trifluorobenzylester methacrylate A15 with an HPLC purity of 94.4% area. The product can be recrystallized in toluene/heptane to provide an improved HPLC purity of 97.3% area.

Preparation Example A16 Poly-6-[4-[(E)-3-oxo-3-[(3,4,5-trifluorophenyl)methoxy]prop-1-enyl]phenoxy]hexyl 2-methylprop-2-enoate $[C_{26}H_{27}F_3O_5]_n$
$[476.48]_n$ 8.40 g of monomer A15 are dissolved in 38 ml of tetrahydrofurane. 0.04 g of 2,2'-Azobis(2-methylpropionitrile are added and the solution purged by applying 5 cycles of vacuum, each followed by purging with nitrogen. The solution is stirred under nitrogen for 18 h at 60° C. The solid polymer is isolated by dropping the polymer solution into 500 ml of cooled (−10° C.) methanol under vigorous stirring. The precipitate is filtered off while still cold and dried under vacuum at 40° C. Polymer A16 is obtained with Mw of 290'955 and Mn of 48'432.

Preparation of Orientating Object Materials (OSM)

OSM1

1.98 g of poly-methyl methacrylate with Mw of 15000 (Fluka) are dissolved in 8.0 g of toluene, followed by 0.02 g of polymer A4 to give OSM1.

3.409 g of poly-methyl methacrylate with Mw of 15000 (Fluka) are dissolved in 6.5 g of toluene, followed by 0.091 g of polymer A4 to give OSM 2.

OSM3

1.9 g of poly-methyl methacrylate with Mw of 15000 (Fluka) are dissolved in 8.0 g of toluene, followed by 0.1 g of polymer A4 to give OSM 3.

OSM4

3.325 g of poly-methyl methacrylate with Mw of 15000 (Fluka) are dissolved in 6.5 g of toluene, followed by 0.175 g of polymer A4 to give OSM 4.

OSM5

3.28 g of CN9010EU (Sartomer), 3.28 g of SR351 (Sartomer) and 3.28 g of Miramer M1183 (Miwon Specialty Chemical) are mixed under stirring. 0.1 g of polymer A4 are added, the mixture is further stirred overnight. 0.1 g of dicumyl peroxide (Aldrich) are added, the mixture is further stirred for 1 h to give OSM 5.

OSM6

1.88 g of CN9010EU (Sartomer), 3.76 g of SR9035 (Sartomer) and 3.76 g of Miramer M1183 (Miwon Specialty Chemical) are mixed under stirring. 0.5 g of polymer A4 are added, the mixture is further stirred overnight. 0.1 g of dicumyl peroxide (Aldrich) are added, the mixture is further stirred for 1 h to give OSM 6.

OSM 7

4 g of CN9010EU (Sartomer), 7.8 g of SR9035 (Sartomer) and 7.8 g of Miramer M1183 (Miwon Specialty Chemical) are mixed under stirring. 0.2 g of polymer A4 are added, the mixture is further stirred overnight 0.2 g of Irgacure 819 (BASF) are added, the mixture is further stirred for 1 h to give OSM 7.

OSM 8

1.88 g of CN9010EU (Sartomer), 3.76 g of SR9035 (Sartomer) and 3.76 g of Miramer M1183 (Miwon Specialty Chemical) are mixed under stirring. 0.5 g of polymer A5 are added, the mixture is further stirred overnight. 0.1 g of Irgacure 819 (BASF) are added, the mixture is further stirred for 1 h to give OSM 8.

OSM9

1.88 g of CN9010EU (Sartomer), 3.76 g of SR9035 (Sartomer) and 3.76 g of Miramer M1183 (Miwon Specialty Chemical) are mixed under stirring. 0.5 g of polymer A6 are added, the mixture is further stirred overnight. 0.1 g of Irgacure 819 (BASF) are added, the mixture is further stirred for 1 h to give OSM 9.

OSM10

1.9 g of poly-methyl methacrylate with Mw of 15000 (Fuka) are dissolved in 8.0 g of toluene, followed by 0.1 g of polymer A12 to give OSM 10.

OSM11

1.9 g of poly-methyl methacrylate with Mw of 15000 (Fluka) are dissolved in 8.0 g of toluene, followed by 0.1 g of polymer A16 to give OSM 11.

OSM 12

1.49 g of cellulose acetate (Eastman CA-398-3) are dissolved in 8.43 g of tetrahydrofurane, followed by 0.08 g of polymer A12 to give OSM 12.

OSM 13

1.49 g of cellulose acetate (Eastman CA-398-3) are dissolved in 8.43 g of tetrahydrofurane, followed by 0.08 g of polymer A16 to give OSM 13.

Preparation of Polymerisable Liquid Crystal Materials (LCP)

LCP1

1.9 g of Paliocolor LC242 (BASF) and 0.002 g of 2,6-di-tert-butyl-4-methylphenol (Fluka) are melted at 80° C. Under stirring 0.098 g of Irgacure 907 (BASF) are added and mixed to give LCP 1.

LCP 2

1.9 g of Paliocolor LC1057 (BASF) and 0.002 g of 2,6-di-tert-butyl-4-methylphenol (Fluka) are melted at 105° C. Under stirring 0.098 g of Irgacure 907 (BASF) are added and mixed to give LCP 2.

LCP 3

11.1 g of Benzoic acid, 2,5-bis[[4-[[6-[(1-oxo-2-propenyl)oxy]hexyl]oxy]benzoyl]oxy]-, pentyl ester, 0.48 g of Irgacure 907 (BASF), 0.06 g of TEGO Flow 300 (Evonik), 0.012 g of 2,6-di-tert-butyl-4-methylphenol (Fluka) and 0.36 g of Kayarad DPCA-20 (Nippon Kayaku) are dissolved in 28.0 g of n-butyl acetate to give LCP 3.

Application Examples

Application Example 1

Figure 3:
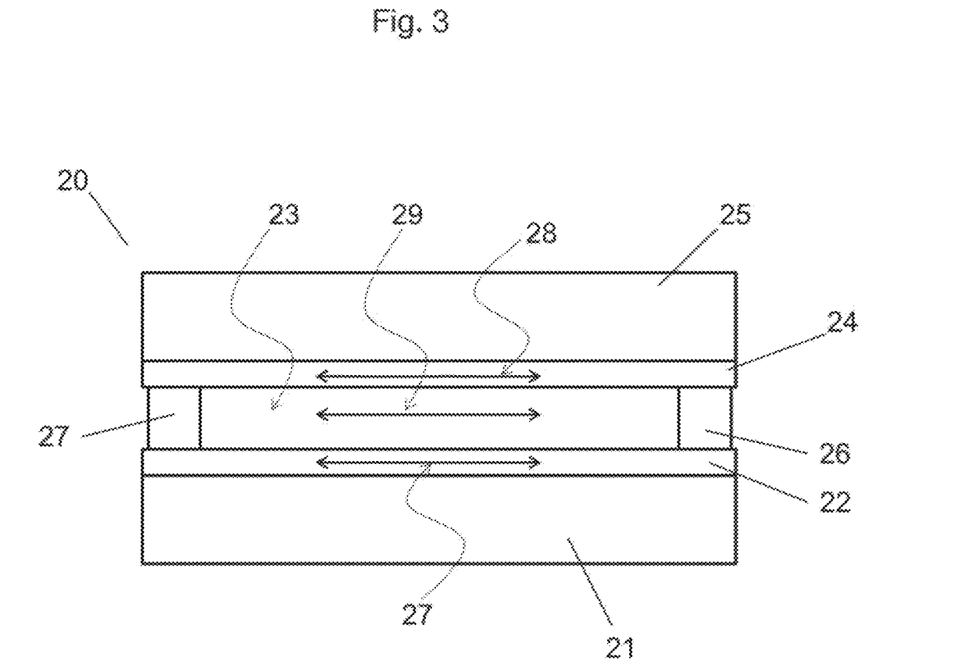
FIG. 3 shows a cell, wherein a liquid crystal is aligned by two photo-aligned objects.

In this example a device is made as illustrated in FIG. 3. OSM 1 is coated with wire bar no. 0 (RK Print-Coat Instruments) on two glass plates 21, 25, which serve as support and dried at 80° C. for 4 minutes, which gives objects in the form of films with a thickness of 1 µm. The obtained objects 22 and 24 are then exposed to linearly polarized light at 200 mJ/cm$^2$ (280-320 nm), thereby defining first and second alignment directions 27, 28, respectively. Two strips 26, 27 of 40 µm thick adhesive tape are put onto the coated side, close to two parallel edges, of the first glass as spacers. The first glass is then placed on a hot plate at 60° C. Preheated LCP 1 (80° C.) is dropped onto the coated side of the first glass. The second glass is then placed with the coated side in contact with the LCP such that the alignment directions 27, 28 of the two photo-aligned objects are parallel. The thus assembled device 20 is heated at 80° C. for 10 minutes and then exposed to uv-light (Fusion UV Systems, Bulb H) at 2000 mJ/cm$^2$ in order to cure the LCP. When arranging the obtained device 20 between crossed polarizers, uniform orientation of the LCP in the direction 29 is observed.

Application Example 2

A device is prepared in the same way as in application example 1, but using OSM 3 instead of OSM 1. The thickness of the OSM 1 films is 0.8 µm. When arranging the obtained device between crossed polarizers, uniform orientation of the LCP is observed.

Application Example 3

OSM 2 is coated with Zehntner Coater (ZUA 2000.150 Universal applicator) with 133 µm setting onto two glass plates as a support and dried at 80° C. for 4 minutes, which results in films with a thickness of 16 µm. Using the two objects, a device is made in the same way as in application example 1. When arranging the obtained device between crossed polarizers, uniform orientation of the LCP is observed.

Application Example 4

Figures 4, 4A:
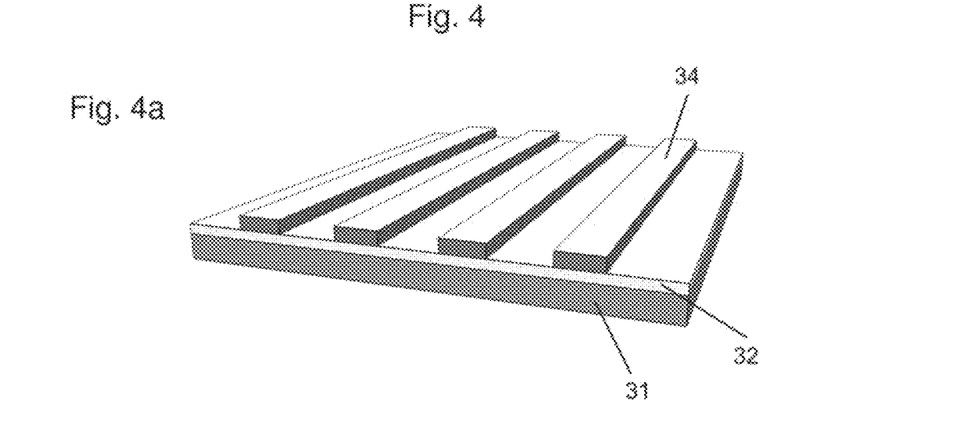
FIGS. 4a, 4b, and 4c illustrate an example of generating a photo-alignable object with surface structures.
Figure 4B:
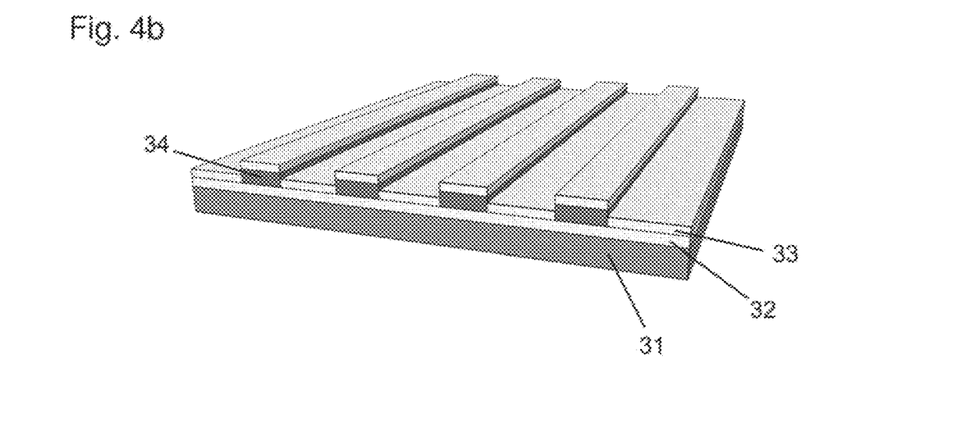
Figure 4C:
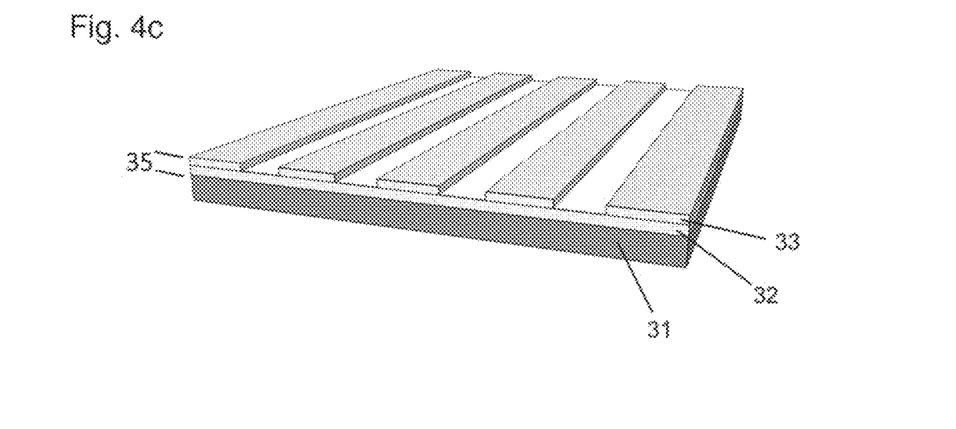

As in application example 2, OSM 3 is coated with wire bar no. 0 (RK Print-Coat Instruments) onto two glass plates and dried at 80° C. for 4 minutes. On top of the resulting OSM 3 layer 32 of the first coated glass plate 31, 0.5 cm wide (80 µm) strips 34 made from a cellulose triacetate film are placed in parallel, with a distance of 0.5 cm, as illustrated in FIG. 4a. OSM 4 is coated with wire bar no. 0 to prepare a film 33, still containing solvent (FIG. 4b). After the film is dried at 80° C. for 4 minutes the strips 34 are removed to give a structured surface with areas comprising only film 32 and areas comprising film 33 on top of film 32 (FIG. 4c), with a thickness difference of approx. 12 µm. The obtained object 35 is then exposed to linearly polarized light at 200 mJ/cm$^2$ (280-320 nm), whereby the polarization direction is parallel to the length direction of the structure, which corresponds to the length direction of the removed strips. A device is then made using the two glasses in the same way as in application example 1. When arranging the obtained device between crossed polarizers, uniform orientation of the LCP is observed.

Application Example 5

A device is made using OSM 3 in the same way as in application example 2, with the modification, that LCP 2 is used instead of LCP 1, LCP 2 is preheated to 105° C. before dropping it onto the object and the device is heated to 105° C. for 10 minutes before curing the LCP. When arranging the obtained device between crossed polarizers, uniform orientation of the LCP layer is observed.

Application Example 6

A device is made in the same way as in application example 4, with the modification, that LCP 2 is used instead of LCP 1, LCP 2 is preheated to 105° C. before dropping it onto the object and the device is heated to 105° C. for 10 minutes before curing the LCP. When arranging the obtained device between crossed polarizers, uniform orientation of the LCP is observed.

Application Example 7

OSM 5 is coated with wire bar no. 0 (RK Print-Coat Instruments) onto two glass plates. The coatings are first cured at 150° C. for 15 minutes and then at 200° C. for 10 minutes, resulting in films with a thickness of 1 µm. Using the two objects, a device is made in the same way as in application example 1. When arranging the obtained device between crossed polarizers, uniform orientation of the LCP is observed.

Application Example 8

OSM 5 is casted on to a reflecting aluminum foil and first cured at 150° C. for 15 minutes and then at 200° C. for 10 minutes, resulting in a film with a thickness of approximately 100 µm. The obtained object is then exposed to linearly polarized light at 200 mJ/cm$^2$ (280-320 nm). LCP 3 is spin coated at 2000 rpm for 30 seconds and dried at 550° C. for 2 minutes. After cooling to room temperature, the LCP layer is UV cured under nitrogen at 1500 mJ/cm$^2$ (300-400 nm). When observing the LCP layer through a linear polarizer arranged above the LCP layer, uniform orientation can be seen.

Application Example 9

OSM 6 is coated with Zehntner Coater (ZUA 2000.150 Universal applicator) with 300 µm setting onto a glass plate, cured at 150° C. for 30 minutes, to give a film thickness of about 70 µm. The obtained photo-alignable object is then exposed to linearly polarized light at 500 mJ/cm$^2$ (280-320 nm). LCP 3 is spin coated on top of the object at 2000 rpm for 30 seconds and dried at 55° C. for 4 minutes. After cooling to room temperature, the LCP layer is UV cured under nitrogen at 1500 mJ/cm$^2$ (300-400 nm). The film stack resulting from OSM6 and LCP3 coating is delaminated from the glass plate. When arranging the film between crossed polarizers, uniform orientation of the LCP is observed.

Application Example 10

OSM 7 is coated with Zehntner Coater (ZUA 2000.150 Universal applicator) with 50 µm setting onto a glass plate. After waiting for 5 minutes at room temperature the coating is cured under nitrogen with UV LED (395 nm) at 4000 mJ/cm$^2$, to give a film with a thickness of about 10 µm. The obtained photo-alignable object is then exposed to linearly polarized light at 1000 mJ/cm² (280-320 nm). LCP 3 is spin coated at 2000 rpm for 30 seconds and dried at 55° C. for 4 minutes. After cooling to room temperature, the LCP is UV cured under nitrogen at 1500 mJ/cm² (300-400 nm). When observing the coated glass plate between crossed polarizers, uniform orientation is seen.

Application Example 11

OSM 7 is coated with Zehntner Coater (ZUA 2000.150 Universal applicator) with 400 µm setting onto a glass plate. After 5 minutes at room temperature the resulting layer is cured under nitrogen at 4000 mJ/cm² (300-400 nm) and has a film thickness of about 220 µm. The obtained object is then exposed to linearly polarized light at 1000 mJ/cm² (280-320 nm). LCP 3 is spin coated at 2000 rpm for 30 seconds and dried at 55° C. for 4 minutes. After cooling to room temperature, the LCP is UV cured under nitrogen at 1500 mJ/cm² (300-400 nm). When observing the coated glass plate between crossed polarizers, uniform orientation is seen.

Application Example 12

Figure 5:
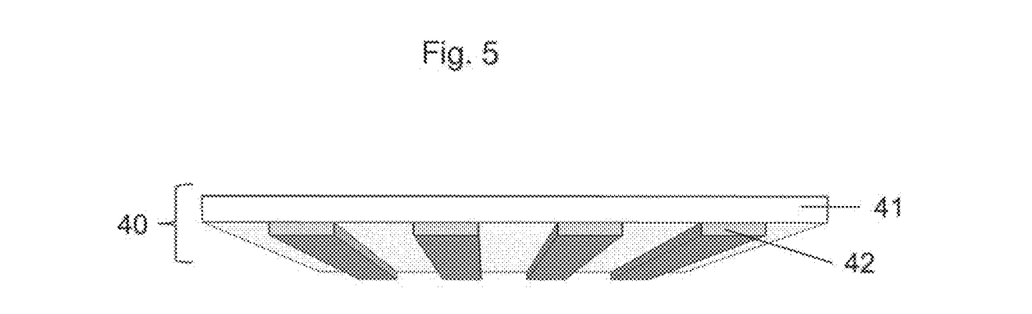
FIGS. 5a and 5b illustrate a method of generating a photo-alignable object with surface structures by imprinting.
Figure 5A:
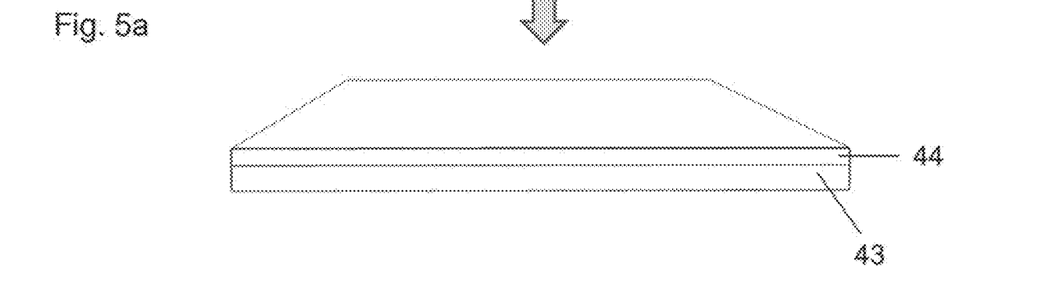
Figure 5B:
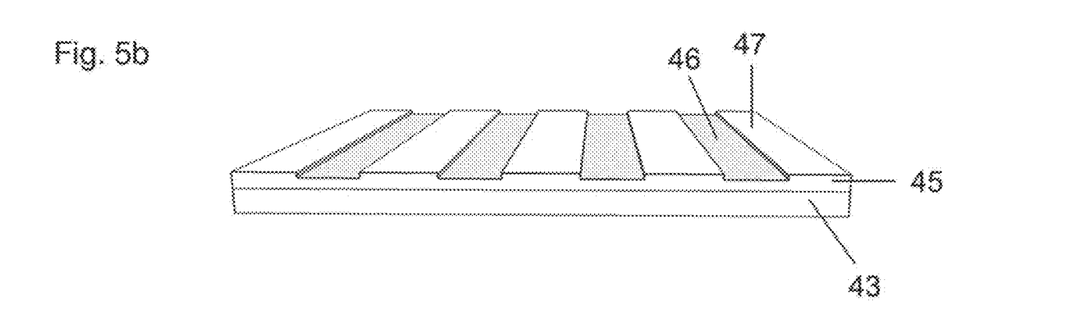
Figure 6A:
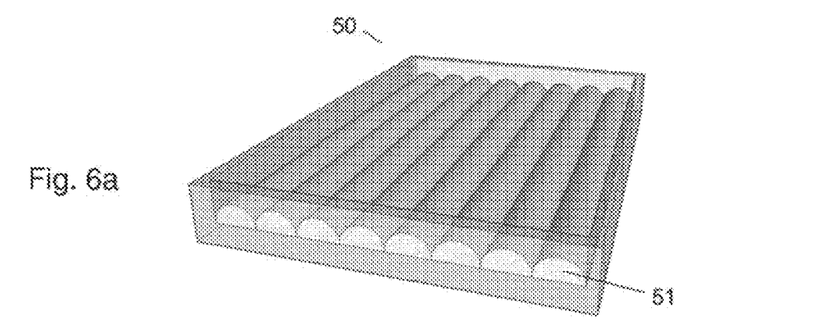
FIGS. 6a, 6b, 6c and 6d show a method for generating optically anisotropic lenses using a photo-aligned object with surface structures.
Figure 6B:
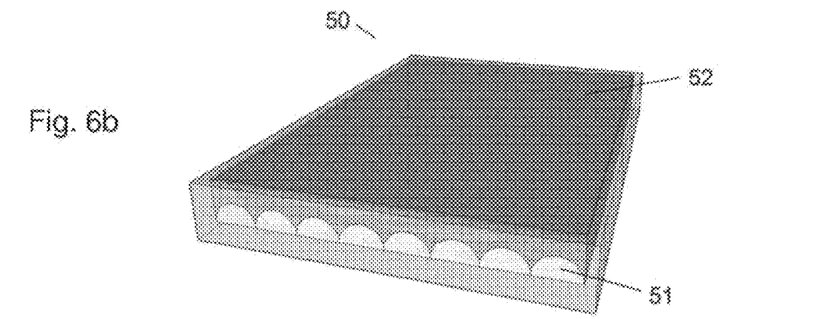
Figure 6C:
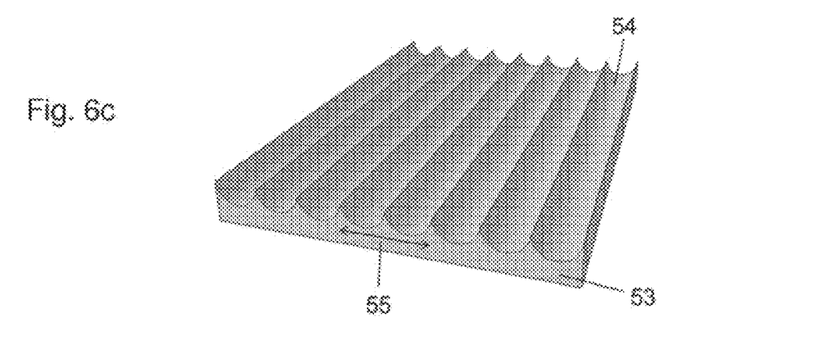
Figure 6D:
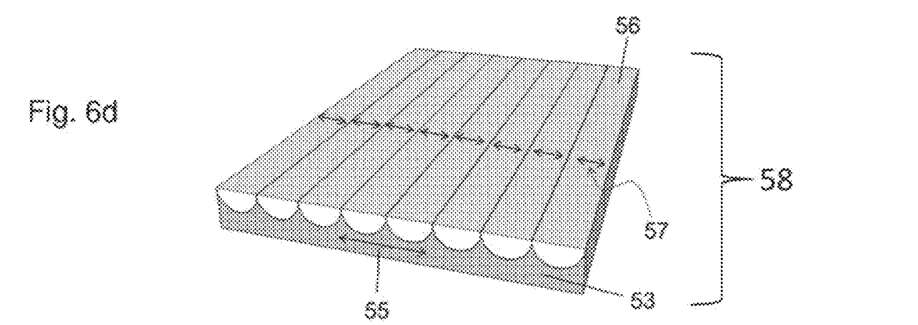

An embossing tool 40 is prepared from a first glass plate 41 by sticking strips 42 of an adhesive tape parallel to each other on the glass plate, as illustrated in FIG. 5a. The distance between the strips is 0.5 cm and the width of the strips is 1.8 cm. The thickness of the tape is 50 µm. The glass plate with the adhesive strips is then vapour treated with Trichloro(1H,1H,2H,2H-perfluorooctyl)silane for 5 minutes, which is then a glass embossing tool 40. OSM 8 is coated with Zehntner Coater (ZUA 2000.150 Universal applicator) with 200 µm setting onto a second glass plate 43, to prepare a film 44. The glass embossing tool 40 is pressed onto the film 44, which is then cured by irradiation through the glass embossing tool with the uv light of a UV LED (395 nm) at 4000 mJ/cm². The glass embossing tool is then removed. On the second glass plate 43 is now a structured film 45 with two height levels 46 and 47 (FIG. 5b), the lower height of which is about 60 µm and the larger height is about 105 µm. The so obtained photo-alignable, structured object is then exposed to linearly polarized light at 1000 mJ/cm² (280-320 nm). LCP 3 is spin coated on top of the photo-aligned, structured object 45 at 2000 rpm for 30 seconds and dried at 55° C. for 4 minutes. After cooling to room temperature, the LCP is UV cured under nitrogen at 1500 mJ/cm² (300-400 nm). When the so obtained device is arranged between crossed polarizers uniform orientation of the LCP layer is observed.

Application Example 13

OSM 9 is preheated at 50° C., filtrated and coated with Zehntner Coater (ZUA 2000.150 Universal applicator) with 50 µm setting onto a glass plate, then cured under nitrogen by irradiation with the light of a UV LED (395 nm) at 4000 mJ/cm². A film with a thickness of approximately 10 µm results. The obtained object is then exposed to linearly polarized light at 1000 mJ/cm² (280-320 nm). LCP 3 is spin coated at 2000 rpm for 30 seconds and dried at 55° C. for 4 minutes. After cooling to room temperature, the LCP is UV cured under nitrogen at 1500 mJ/cm² (300-400 nm). When observing the LCP layer between crossed polarizers, uniform orientation is seen.

Application Example 14

A device is prepared in the same way as in application example 1, but using OSM 10 instead of OSM 1 and the resulting films with a thickness of 1.3 µm are exposed to linearly polarized light at 1000 mJ/cm² (280-320 nm) instead of 200 mJ/cm² (280-320 nm). When arranging the obtained device between crossed polarizers, uniform orientation of the LCP is observed.

Application Example 15

A device is prepared in the same way as in application example 1, but using OSM 11 instead of OSM 1 and the resulting films with a thickness of 1.3 µm are exposed to linearly polarized light at 1000 mJ/cm² (280-320 nm) instead of 200 mJ/cm² (280-320 nm). When arranging the obtained device between crossed polarizers, uniform orientation of the LCP is observed.

Application Example 16

OSM 12 is coated with Zehntner Coater (ZUA 2000.150 Universal applicator) with 100 µm setting onto a glass plate. After 10 minutes at room temperature the coating is dried at 70° C. for 10 minutes to give a dry film thickness of 13 µm. The obtained object is then exposed to linearly polarized light at 1000 mJ/cm² (280-320 nm). LCP 3 is spin coated at 2000 rpm for 30 sec and dried at 55° C. for 4 minutes. After cooling to room temperature, the LCP is UV cured under nitrogen at 1500 mJ/cm² (300-400 nm). When observing the LCP layer between crossed polarizers, uniform orientation is seen.

Application Example 17

A device is prepared in the same way as in application example 16, but using OSM 13 instead of OSM 12. When observing the LCP layer between crossed polarizers, uniform orientation is seen.

Application Example 18

OSM 6 is coated with Zehntner Coater (ZUA 2000.150 Universal applicator) with 300 µm setting onto a glass plate, cured at 150° C. for 30 minutes, to give a film thickness of about 70 µm. The film is then removed from the substrate to achieve a photo-alignable object in the form a free standing film.

Application Example 19

The free standing film obtained in application example 18 is exposed to linearly polarized light at 500 mJ/cm² (280-320 nm). The photo-aligned object in the form of a free standing film is then fixed on a vacuum chuck of a spin coater and LCP 3 is spin coated on top of the photo-aligned object at 2000 rpm for 30 seconds and dried at 55° C. for 4 minutes. After cooling to room temperature, the LCP layer is UV cured under nitrogen at 1500 mJ/cm² (300-400 nm). When arranging the film between crossed polarizers, uniform orientation of the LCP is observed.

What is claimed is:
1. A photo-alignable object comprising a photo-alignable material, the photo-alignable object having a thickness of more than 2 µm and a topographical surface structure in the photo-alignable material, with a depth of the topographical surface structure larger than 1 μm, wherein the surface structure comprises microelements or arrays of microelements, and wherein the photo-alignable object is in the form of a free standing film.

2. The photo-alignable object according to claim 1, wherein the depth of the topographical surface structure is larger than 10 μm.

3. The photo-alignable object according to claim 1, wherein the surface structure has the form of lenses, Fresnel lenses, lenticular lenses, lens arrays, microlenses, prisms, microprisms or is a structure with rectangular or triangular cross-sections.

4. The photo-alignable object according to claim 1, comprising a material composition which comprises a photo-alignable material and an additional substance which does not comprise photo-alignable moieties, wherein the photo-alignable material is phase separated from the additional substance.

5. The photo-alignable object according to claim 4, in which the percentage by weight of the sum of photo-alignable materials in the material composition is less than 50%.

6. The photo-alignable object according to claim 4, in which the photo-alignable material comprises fluorinated and/or siloxane moieties and/or is a polysiloxane.

7. A photo-aligned object, manufactured by exposing an object according to claim 1 to aligning light.

8. A device containing a slave material, which has been aligned by a photo-aligned object which has been manufactured by exposing an object according to claim 1 to aligning light, wherein the slave material has at least one surface, which is topographically structured and is in contact with the photo-aligned object.

9. The device according to claim 8, wherein the slave material has the function of anisotropic lenses.

10. Autostereoscopic 3D display comprising a device according to claim 8.

11. The photo-alignable object according to claim 1, wherein the surface structures are periodic.

12. The photo-alignable object according to claim 1, wherein the surface structures are non-periodic.

13. The photo-alignable object according to claim 1, wherein the smallest width of a microelement is larger than 500 nm.

14. The photo-alignable object according to claim 1, wherein the smallest width of a microelement is larger than 5 μm.

15. The photo-alignable object according to claim 1, wherein the photo-alignable object has been made from a material composition, which comprises a photo-alignable material.

16. The photo-alignable object according to claim 1, wherein the photo-alignable object is rigid.

17. The photo-alignable object according to claim 1, wherein the thickness of the photo-alignable object is larger than 50 μm.

18. The photo-alignable object according to claim 1, wherein the thickness of the photo-alignable object is larger than 1 mm.

19. The device according to claim 8, wherein the slave material is a liquid crystal polymer material.

* * * * *